United States Patent [19]

Bilezikjian

[11] Patent Number: 5,553,923
[45] Date of Patent: Sep. 10, 1996

[54] BASE FRAME FOR AN AIRCRAFT SEAT

[75] Inventor: Vahe Bilezikjian, Denton, Tex.

[73] Assignee: Weber Aircraft, Inc., Gainesville, Tex.

[21] Appl. No.: 164,064

[22] Filed: Dec. 8, 1993

[51] Int. Cl.⁶ .................................................. A47C 7/02
[52] U.S. Cl. ................... 297/452.2; 297/232; 297/463.1
[58] Field of Search ............................... 297/232, 216.2,
297/452.18, 452.2, 216.1, 248, 440.22,
440.1, 463.1; 248/188.1, 501; 244/118.6;
403/373, 380, 384

[56] References Cited

U.S. PATENT DOCUMENTS

| | | | |
|---|---|---|---|
| 2,408,907 | 10/1946 | Booth | 403/380 |
| 3,230,005 | 1/1966 | Staples | 297/440.1 X |
| 3,785,600 | 1/1974 | Padovano | 297/248 X |
| 3,893,729 | 7/1975 | Sherman et al. | 248/188.1 X |
| 4,229,040 | 10/1980 | Howell et al. . | |
| 4,375,300 | 3/1983 | Long et al. . | |
| 4,382,628 | 5/1983 | Palmgren . | |
| 4,489,978 | 12/1984 | Brennan . | |
| 4,718,719 | 1/1988 | Brennan | 248/188.1 X |
| 4,911,381 | 3/1990 | Cannon et al. | 297/216.2 X |
| 5,069,505 | 12/1991 | Amthor et al. . | |
| 5,104,065 | 4/1992 | Daharsh et al. . | |
| 5,224,755 | 7/1993 | Beroth . | |
| 5,306,072 | 4/1994 | Caldwell | 297/232 |

Primary Examiner—Milton Nelson, Jr.
Attorney, Agent, or Firm—Crutsinger & Booth

[57] ABSTRACT

A spreader and leg assembly for the base frame of an aircraft passenger seat including spaced saddles on the spreader and spaced stirrups on the leg assemblies that encircle a plurality of quadrants of the stretcher tubes to form a base frame.

17 Claims, 4 Drawing Sheets

BASE FRAME FOR AN AIRCRAFT SEAT

FIELD OF THE INVENTION

The present invention relates to a support structure for aircraft seats. More particularly, the present invention relates to a removable spreader for the base frame assembly of an aircraft seat.

BACKGROUND OF THE INVENTION

The design of passenger seats for aircraft requires consideration of passenger comfort, the number of seats and space limitations in a particular aircraft, and the location of the seat in the aircraft. Passenger seats generally include an aluminum base frame assembly to which are attached reclining seat backs, center arm rest assemblies, fold-down food table assemblies, and fully upholstered seat back and bottom cushion assemblies.

Economy or coach passenger seats are generally narrower and more densely spaced than business class or first class seats. Further, the seats of commuter aircraft are generally closer spaced and more dense than seats for larger widebody international flights.

Business class and first class seats may be provided with a console with personal storage compartments, compartments for cocktail trays, and the like. A first class sleeper seat may include additional features such as a video monitor, an extendable leg rest, and other features for passenger comfort and convenience.

A wide-body aircraft may have center rows of, for example, five seats with aisles extending along each end of the center section of seats. Two, three, or more seats may be mounted between the aisle and the wall of the aircraft in each row of seats. Some rows of seats generally face the front of the aircraft while other rows face the rear of the aircraft. The number and spacing of seats adjacent emergency exits may differ from the seat spacing throughout the remainder of the aircraft.

The base frame for aircraft passenger seats is generally formed by a pair of stretcher tubes or rails which extend across the front and rear of the seat, spreader members supported by the stretcher tubes which extend along opposite sides of the seat for supporting the seat cushions and seat backs and leg assemblies spaced along the length of the stretcher tubes and connected to floor-mounted tracks for supporting the seats.

The spacing of spreaders and legs along the length of the stretcher tubes will vary for different types of seats and different seating arrangements. The position of legs on seats nearest the aisle and seats nearest the wall of the aircraft may vary depending upon the structural design of the aircraft, the number of seats in the row and the location of the row of seats in the aircraft. The connections between spreaders and stretcher tubes and between leg assemblies and stretcher tubes often vary depending upon the location of the spreaders on the stretcher tubes, the location of the legs on the stretcher tubes, whether the seat is a front facing seat or a rear facing seat.

Heretofore the construction and maintenance of aircraft seats has been very expensive because operations have been labor intensive. Further the size and shape of components of the seat vary depending upon the location of the installation in the aircraft, resulting in a multitude of parts that must be kept in inventory for proper maintenance. Periodic maintenance required on aircraft seats and minor changes in a seat, for example, the installation of a telephone in a seat back or arm rest, generally requires replacement or disassembly of the entire seat merely for replacing or installing a component in the seat assembly.

U.S. Pat. No. 5,224,755 discloses a passenger seat leg assembly with an energy absorbing zone. Straps extend around stretcher tubes and are bolted to the leg assemblies for supporting the seats.

U.S. Pat. No. 5,069,505 issued to Amthor et al. on Dec. 3, 1991 discloses a seat divider having hemi-shells at the forward and rearward ends that are oriented downward for engaging the front and rear transverse struts of an aircraft seat base frame. The connection between the seat divider and the tubular transverse struts is formed by an adjustable strap retainer. These strap retainers can be tightened by a clamping element to impart the necessary tension to the retainer strap to permit rotary motion about the transverse strut, but only by overcoming friction. The hemi-shell surface and strap retainer are designed to slide over the transverse strut with the strut passing therebetween, but this connection interferes with the connection between the rear leg and the rear tubular transverse strut, which is also formed by an adjustable strap retainer that slides over the transverse strut. Thus, the base frame must be disassembled to separate the horizontal tubular members from the legs in order to replace or change a spreader. Further, forces encountered during crash testing are concentrated in the clamp elements and retainer straps.

U.S. Pat. No. 4,229,040 issued to Howell et al. on Oct. 21, 1980 discloses a typical base frame for an aircraft seat. The seat support structure includes a pair of spaced horizontal tubular members that extend beneath individual seating stations. These tubular members are maintained in a predetermined spaced relationship by a multiplicity of spacing members each located adjacent to the individual seating stations. Spreaders, which are described as beam members, are equipped with a forward enlarged cylindrical portion to receive and encircle the forward horizontal tubular member and a second enlarged cylindrical portion to receive and circle the rear horizontal tubular member. Because the enlarged cylindrical portions are designed to slide over the horizontal tubular members with the tubular members passing therethrough, the cylindrical portions interfere with the legs attached to the horizontal tubular members that vertically support the tubular members. Thus, the base frame must be disassembled to separate the horizontal tubular members from the legs in order to replace or change a spreader.

U.S. Pat. No. 4,375,300 issued to Long et al. on Mar. 1, 1983 discloses a framing system for an aircraft passenger seat including support members mounted on stretcher tubes. The front end of the arm support on spreader is secured by a single vertically extending screw to the top of the stretcher tube. The rear of the spreader is secured by a horizontally extending bolt to the rear stretcher tube.

The important structural requirements for safety must be met and at the same time the airline operator needs to be able to easily and cost effectively maintain the seats. It is often necessary to change the seating configuration in the aircraft to meet different passenger and market needs. In the past, the assembly and disassembly of the seats has been a complicated, time consuming, and expensive process, often requiring that most of the seat support structure be disassembled in order to move or change the seating configuration. Furthermore, every reduction in the weight of the seats without reducing the structural integrity saves the airline fuel and reduces operating expenses.

Accordingly, it is an object of the present invention to provide an improved aircraft seat support structure in which the base frame spreaders for the passenger seats can be quickly and easily mounted or removed from the rest of the support structure without reducing the structural strength of the seat. It is another object of the invention to provide an improved aircraft seat support structure with a reduced number of parts. It is another object of the invention to provide an aircraft seat support structure that is capable of meeting the normal safety requirements while being lighter in weight.

It is another object of this invention to provide a design which will allow placement of spreaders and legs along a stretcher tube without regard to having a stretcher and a leg exist in the same vertical plane.

SUMMARY OF THE INVENTION

A typical aircraft seat base frame has a front leg structure for supporting a front horizontal stretcher member and a rear leg structure for supporting a rear horizontal stretcher member. The stretcher members are typically tubular with circular cross-sections, however, the stretcher members can be constructed with cross-sections of other shapes. A base frame spreader is used for maintaining the front and rear horizontal stretcher members in parallel, spaced-apart relationship. The spreader has a front portion for connecting to the front horizontal stretcher member and a rear portion for connecting to the rear horizontal stretcher member.

According to one aspect of the invention, the front portion of the spreader has an inverted, generally U-shaped structure formed thereon that is positioned over the front horizontal stretcher member. The rear portion of the spreader has an inverted, generally U-shaped structure formed thereon that is positioned over the rear horizontal stretcher member. A first stirrup is provided that has a generally U-shaped structure that is positioned under the front horizontal stretcher member and fastened to the inverted, generally U-shaped structure formed on the front portion of the spreader to releasably clamp the front horizontal stretcher member therebetween. A second stirrup is provided that has a generally U-shaped structure that is positioned under the rear horizontal stretcher member and fastened to the inverted, generally U-shaped structure on the rear portion of the spreader to releasably clamp the rear horizontal stretcher member therebetween. A bolt secures the U-shaped structure of the spreader and a stirrup to a horizontal stretcher member. Thereby, the spreader can be easily and quickly removed from the rest of the aircraft seat base frame assembly without disassembling any other portion of the base frame.

The front horizontal member has a plurality of aligned apertures therethrough that are spaced-apart along the stretcher member and the rear horizontal member also has a plurality of aligned apertures therethrough that are spaced-apart along the stretcher member. The inverted, generally U-shaped structure of the front portion of the spreader has at least one aperture in each of the downwardly extending wall sections thereof, and the inverted, generally U-shaped structure of the rear portion of the spreader has at least one aperture in each of the upwardly extending wall sections thereof. The apertures in the U-shaped structures on the spreader are aligned with selected corresponding apertures in the front and rear horizontal stretcher members such that the spreader, the stirrups, and the front and rear horizontal stretcher members can be releasably connected by screw, nut and bolt, or other threaded fastener through the aligned apertures.

In another preferred embodiment of the invention, the spreader is integrally formed of a lightweight aircraft aluminum to have a web that is oriented in a plane transverse to the parallel front and rear stretcher members and to have stiffening flanges and ribs that project perpendicularly to either side of the web. The combination of lightweight aircraft aluminum and the stiffening flanges and ribs provides the preferred structural strength at minimal weight.

BRIEF DESCRIPTION OF THE DRAWINGS

The accompanying drawings are incorporated into and form a part of the specification to illustrate several examples of the present invention. These drawings and the detailed description of the preferred embodiments serve to explain the principles of the invention. The drawings are only for the purposes of illustrating the presently preferred examples of how the invention can be made and used, and the drawings are not to be construed as limiting the invention to only the illustrated embodiment of the invention. The various advantages and features of the present invention will be apparent from a consideration of the drawings in which.

DETAILED DESCRIPTION OF THE PREFERRED EMBODIMENTS

Figure 1:
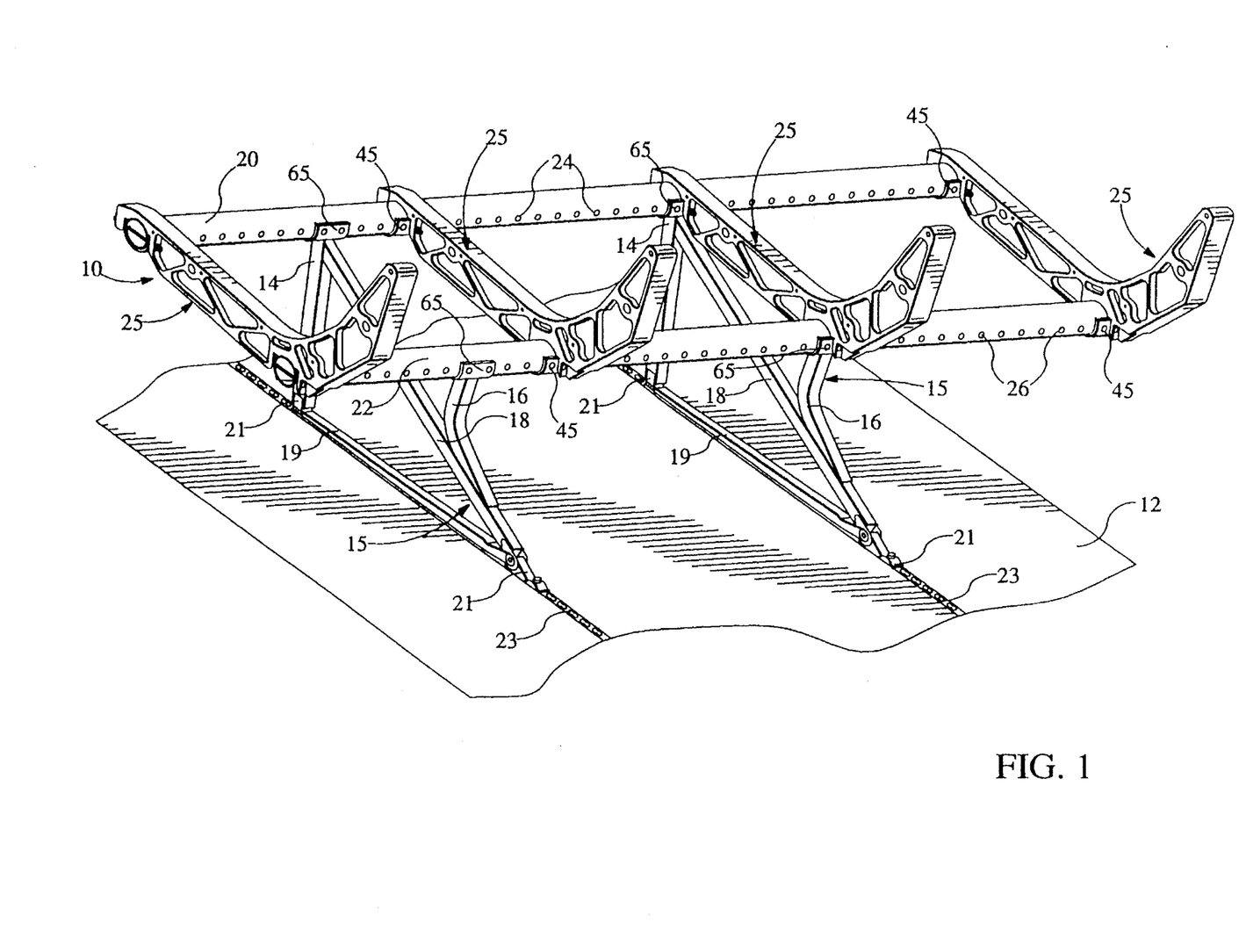
FIG. 1 is a perspective view of a base frame for an aircraft seat secured to tracks laid in an aircraft cabin floor, the support structure including the base frame spreader and seat leg assembly of the present invention.
Figure 2:
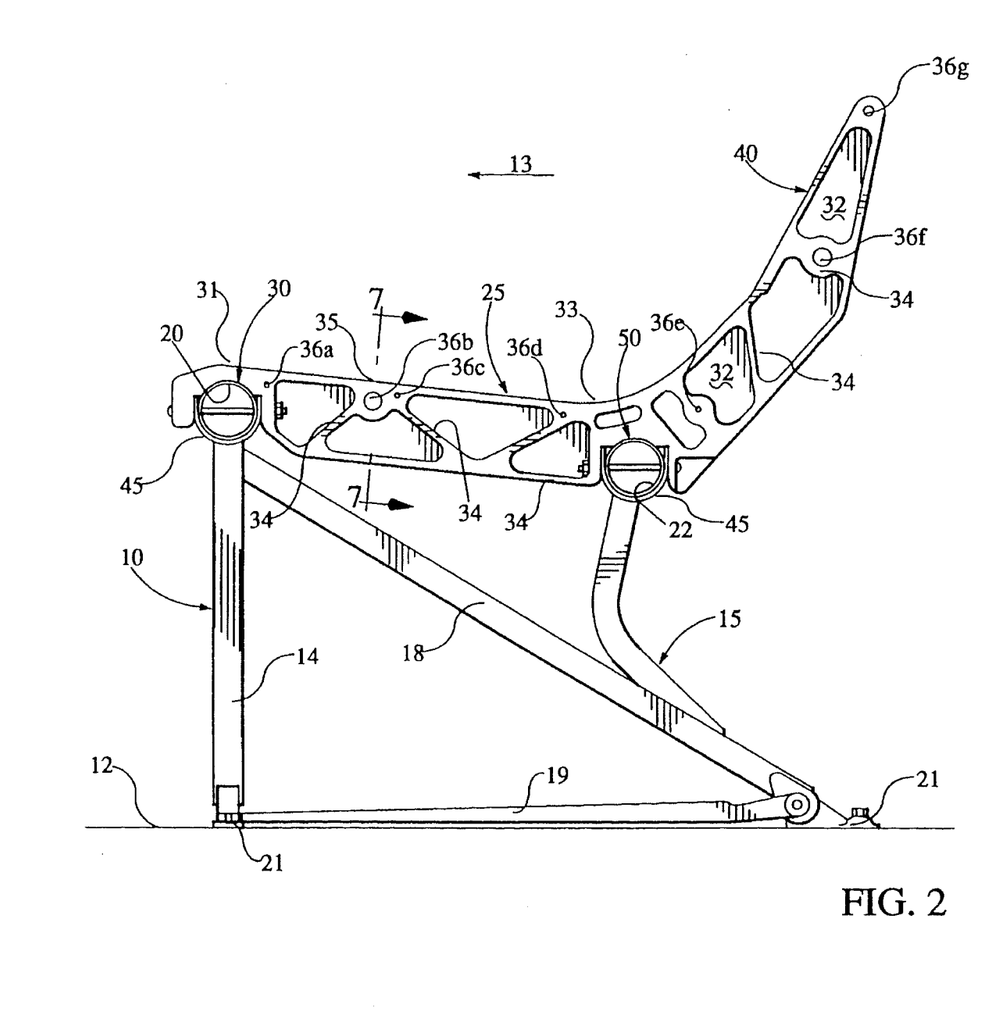
FIG. 2 is a side elevation view of the aircraft seat base frame shown in FIG. 1.

Referring to FIGS. 1 and 2 of the drawing, the numeral 10 generally designates a base frame assembly formed by a pair of stretcher tubes 20 and 22, joined by a plurality of removable spreader members 25, and a plurality of removable leg assemblies 15.

In the illustrated embodiment, stretcher tubes 20 and 22 are of substantially identical construction and have concentric inner and outer walls and a circular cross-section. For the purposes of description, the circular cross-section of the stretcher tubes can be divided into top, bottom, and side quadrants. However, it should be appreciated that stretcher tubes 20 and 22 need not be identical and can be constructed with cross-sections of other shapes, such as elliptical, square, or rectangular.

As will be hereinafter more fully explained, removable spreaders 25 are preferably of substantially identical construction, each having a downwardly facing saddle 30 adjacent the front end thereof and a downwardly facing saddle 50 adjacent the rear end thereof, saddles 30 and 50 resting on stretcher tubes 20 and 22. Stretcher tubes 20 and 22 are supported in leg stirrups 65 on leg assemblies 15.

The base frame 10 secures and supports one or more individual passenger seats (not shown) above the floor 12 of the aircraft cabin. As used herein for the purposes of description, the terms "front" and "rear" are with reference to the facing direction of the aircraft seat, as shown by the direction of arrow 13 in FIG. 2. It should be appreciated that rows of seats are often mounted back-to-back and that the front of a seat may face the rear of the aircraft.

The base frame 10 has a plurality of leg assemblies 15 comprising a front leg structure that typically includes front leg 14, and a rear leg structure that typically includes rear leg 16. The front legs 14 and the rear legs 16 are connected and reinforced by angled struts 18 and bottom horizontal struts 19. Leg assemblies 15 are preferably of identical construction and need not be right or left handed.

The front legs 14 support a front horizontal stretcher tube 20 above the cabin floor 12. Similarly, rear legs 16 support a rear horizontal stretcher tube 22 above the cabin floor 12. The front horizontal stretcher tube 20 and the rear horizontal stretcher tube 22 are supported in parallel, spaced-apart relationship to one another. Furthermore, the horizontal stretcher tubes 20 and 22 are oriented to be perpendicular to the facing direction of the aircraft seat, shown by arrow 13. The front legs 14 and rear legs 16 of the base frame 10 are secured by track fittings 21, for example of the type disclosed in U.S. Pat. No. 5,058,829 to Paul R. Bentley, to tracks 23 laid in the aircraft cabin floor 12.

According to the best mode presently contemplated, base frame spreaders 25 are formed of a single piece of machined aluminum configured to facilitate removal of the spreader from stretcher tubes 20 and 22 without disassembly of the complete base frame 10. Further, saddles 30 and 50 on spreaders 25 are configured such that spreaders 25 and leg stirrups 65 do not interfere which significantly reduces the number of design variations for mounting legs at different locations on stretcher tubes 20 and 22. Saddles 30 and 50 and stirrups 45 and 65 are configured to carry and distribute force along stretcher tubes 20 and 22 to carry tension or compressive loading so that a single spreader 25 can be employed in a front or rear facing seat. Further, saddles 30 and 50 and saddle stirrups 45 and leg stirrups 65 are configured to increase the stiffness of stretcher tubes 20 and 22 by distributing force over a significant length of stretcher tubes 20 and 22.

If spreader members 25 are not positioned vertically above a leg assembly 15, a spreader stirrup 45 is positioned to encircle a lower quadrant of stretcher tubes 20 and 22 while saddles 30 and 50 encircle an upper quadrant of the stretcher tubes. If a spreader 25 is positioned vertically above a leg assembly 15, leg stirrups 65 are positioned in saddles 30 and 50 to encircle at least the lower quadrant of stretcher tubes 20 and 22. Stirrups 45 and 65 preferably encircle at least 180° of the circumference of stretcher tubes 20 and 22 and are secured in position by connectors extending through walls of the stirrups 45 and 65.

Figure 3:
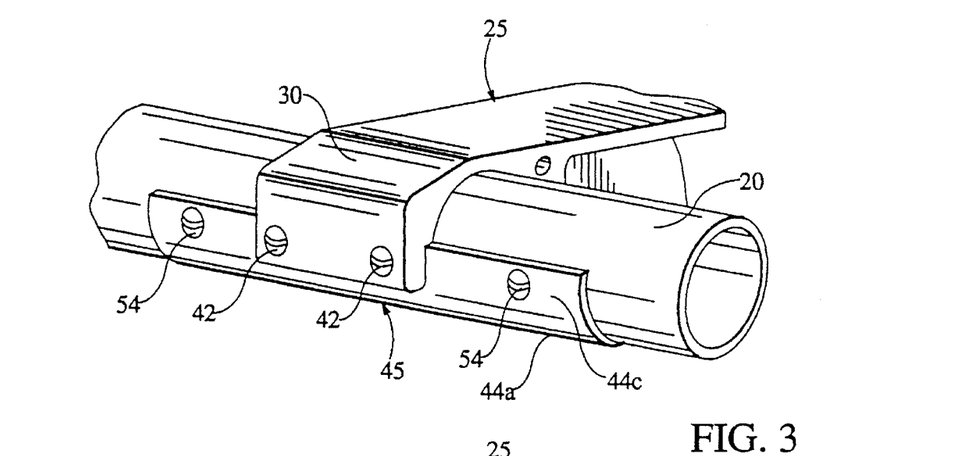
FIG. 3 is a perspective view of the front end portion of a spreader clamped to a segment of a front stretcher tube with a stretcher stirrup that provides structural support and stiffening of the stretcher tube.

Referring now to FIG. 3, the spreader stirrups 45 preferably have a length that is equal to or greater than the width the spreader 25. If necessary for structural strength, the spreader stirrups 45 may have a length that is greater than the width of the spreader 25, for example a length that is at least three times the diameter of the stretcher tubes 20 and 22 such that upwardly directed loading is distributed over a large surface area. The additional length of the stirrup provides structural support to the horizontal stretcher tube 20 at the connection between the stretcher tube 20 and the spreader 25.

As most clearly shown in FIG. 3, the connection of the U-shaped saddle structure 30 of the spreader 25 and the stretcher stirrup 45 clamped to the stretcher tube 20 preferably includes at least two sets of aligned apertures such that two bolts 42 can be used to releasably secure the spreader 25 to the tube 20. If the length of the stretcher stirrup 45 is wider than the spreader 25 as shown in FIG. 3, additional bolts 54 can be used to reinforce the connection between the stretcher stirrup 45 and the horizontal stretcher tube 20.

Figure 4:
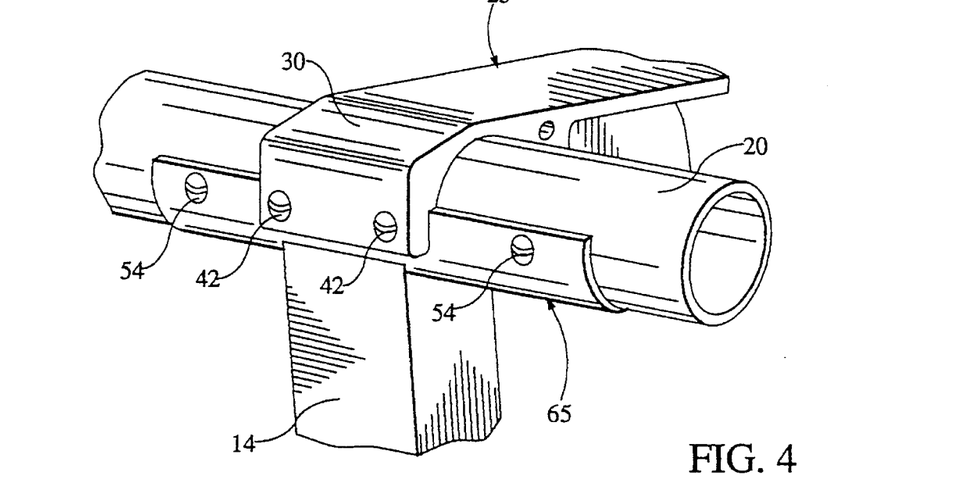
FIG. 4 is a perspective view similar to FIG. 3 wherein the front end portion of a spreader is clamped to a segment of a front stretcher tube with a leg stirrup.

As illustrated in FIG. 4, a leg stirrup 65 is integrally formed on, welded to or otherwise attached, to a front leg 14. The leg 14 and stirrup 65 are otherwise similar to previously described leg 14 and stretcher stirrup 45. It is to be understood, of course, that a leg stirrup 65 is also attached to the rear leg 16 of the base frame 10. If it is desirable to position a spreader 25 along the horizontal stretcher tube 20, the leg stirrup 65 can be used to connect the spreader 15 to the horizontal stretcher tube 20.

Leg stirrups 65 are welded or otherwise secured to leg assemblies 15 and are preferably formed of extruded or drawn metallic material welded or otherwise secured to upper ends of leg assembly 15, as will be hereinafter more fully explained. Further, leg assembly 15 preferably has energy absorbing characteristics wherein through plastic deformation energy will be dissipated. The deformations are limited through the incorporation of stops to prevent deformation of the leg assembly beyond predetermined limits.

Referring back to FIG. 1, in the illustrated embodiment, the front horizontal stretcher tube 20 has a plurality of apertures 24 arranged in two diametrically opposed rows in the side quadrants of the tube 20. As will hereinafter be described in more detail, each of the apertures 24 is formed to provide a passage through the front horizontal stretcher tube 20 to allow the passage of a connector such as a screw, bolt, pull pin or the like through the body of the stretcher tube 20. The plurality of apertures 24 are aligned in parallel and in closely spaced-apart intervals, for example spaced on 1.5 inch centers, along the length of the stretcher tube 20. When connected to the front legs 14, the front horizontal stretcher tube 20 is preferably oriented such that the apertures 24 are oriented in a substantially horizontal plane and parallel to arrow 13.

Similarly, the rear horizontal stretcher tube 22 has a plurality of apertures 26 arranged in two diametrically opposed rows in the side quadrants of the tube 22. Each of the apertures 26 is formed to provide a passage through the rear horizontal stretcher tube 22 to allow the passage of a screw, bolt, pull pin or other suitable connector through the body of the stretcher tube 22. The plurality of apertures 26 are aligned in parallel and in closely spaced-apart intervals along the length of the stretcher tube 22. When connected to the rear legs 16, the rear horizontal stretcher tube 22 is preferably oriented such that the apertures 26 are oriented in a substantially horizontal plane and front to rear.

Continuing to FIG. 2, each spreader 25 has a first portion 35 extending generally horizontally between the front horizontal stretcher tube 20 and the rear horizontal stretcher tube 22. The first portion 35 of the spreader 25 can also at least partially support the bottom of at least one individual passenger seat (not shown). The first portion 35 has a front end portion 31 for connecting to the front horizontal stretcher tube 20 and a rear end portion 33 for connecting to the rear horizontal stretcher tube 22. The spreader 25 further has a second portion 40 extending generally vertically from the rear end portion 33 for at least partially supporting the back of at least one passenger seat.

Figures 5, 6, 7:
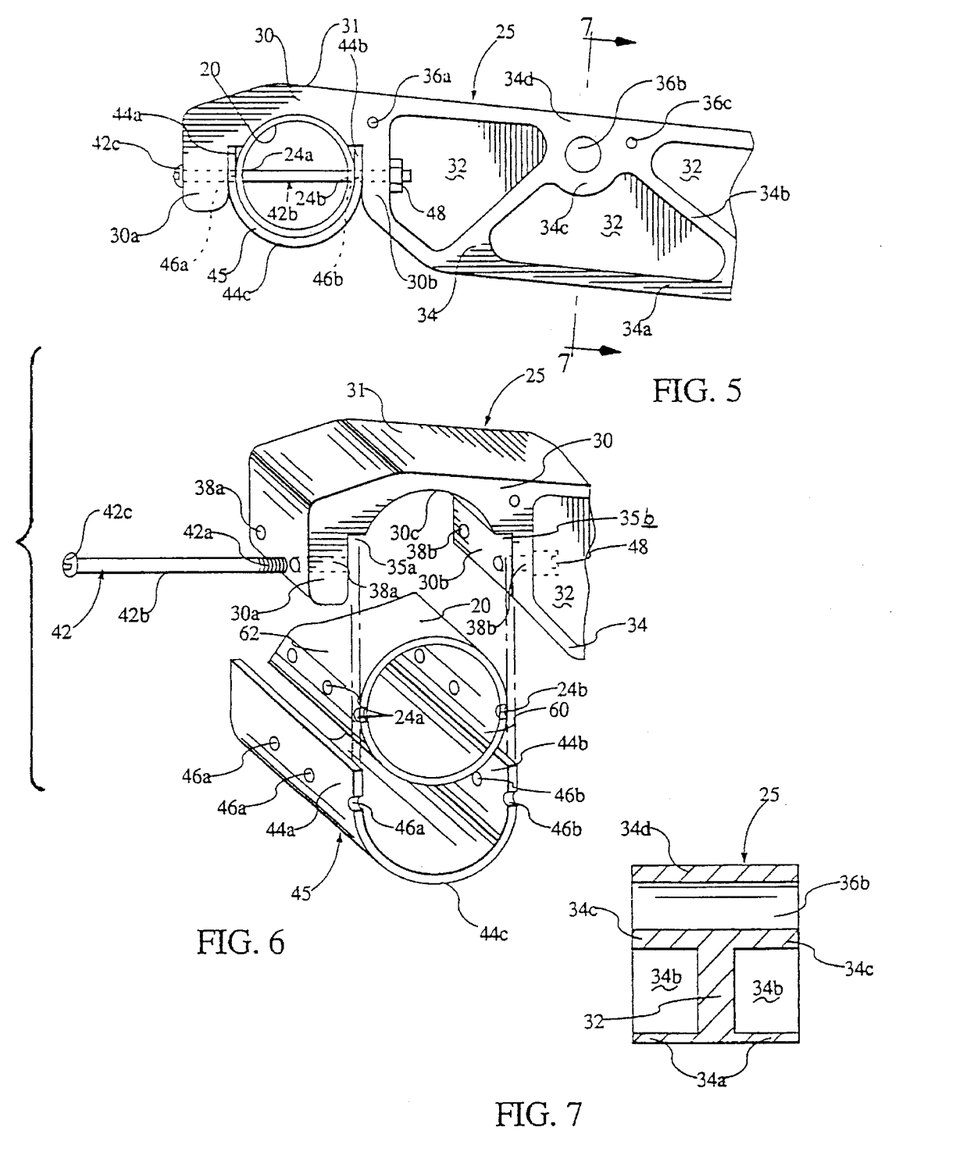
FIG. 5 is an enlarged fragmentary side elevational view of a saddle on the front end portion of a spreader mounted to a front horizontal stretcher tube.
FIG. 6 is an exploded fragmentary perspective view of the front end portion of the base frame spreader showing how it is mounted to or removed from the front horizontal stretcher tube.
FIG. 7 is a cross-sectional view taken along line 7—7 of FIG. 5 showing a detail of the web and stiffener flanges and ribs projecting outwardly from the web that provide structural strength to the spreader while minimizing the weight.
Figure 8:
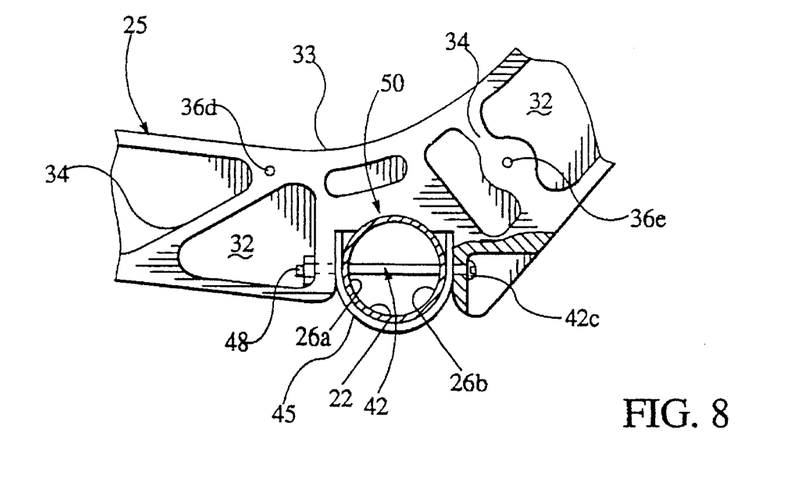
FIG. 8 is an enlarged fragmentary side elevational view of a saddle on the rearward end portion of a base frame spreader mounted to a rear horizontal stretcher tube of the base frame.

Referring to FIGS. 5 and 6, the front end portion 31 of the spreader 25 is shown removably mounted to the front horizontal stretcher tube 20. As best shown in FIG. 6, the front end portion 31 has an inverted, generally U-shaped saddle structure 30 formed thereon that is positioned over the front horizontal stretcher tube 20. Similarly, as shown in FIG. 8 of the drawing, the rear end portion 33 of the spreader 25 is shown removably mounted to the rear horizontal stretcher tube 22. The rear end portion 33 has an inverted, generally U-shaped saddle structure 50 formed thereon that is positioned over the rear horizontal stretcher tube 22. The releasable connection of the spreader 25 to the horizontal stretcher tubes 20 and 22 will be hereinafter explained in more detail.

As best illustrated in FIG. 6 of the drawing, saddle 30 has a concave upper surface 30c which extends around the upper quadrant of stretcher tube 20. Front and rear flange segments , or downwardly extending side members 30a and 30b are horizontally offset from opposite ends of concave surface 30c to form receptacles or clearances 35a and 35b having a depth sufficient to receive side wall sections 44a and 44b on stirrups 45. Referring to FIG. 4, leg stirrups 65 are similarly mounted.

As shown in FIG. 2, the spreader 25 contains holes 36a–g to facilitate attaching components of the passenger seats to the spreader 25, such as seat belts and arm rests, and also for the passage of electronic cable for built in armrest stereo, television, or computer consoles.

As best shown in FIGS. 5 and 7, the body of the spreader 25 is formed to have web portions 32 that are oriented in a substantially vertical plane and to have stiffening flanges and ribs 34 that project perpendicularly to either side of the web portions 32. The web portions 32 are oriented transverse to the front and rear horizontal stretcher tubes 20 and 22. The flanges and ribs 34 have rib portions such as 34a, 34b, 34c, and 34d that define the stiffening ribs 34. As best shown in FIG. 2 of the preferred embodiment of the invention, the structure of the flanges and ribs 34 is designed to resist deformation of the spreader 25 when it is subjected to stress.

The spreader 25 is preferably integrally formed of a lightweight aircraft aluminum. The combination of lightweight aircraft aluminum and the stiffening flanges and ribs 34 provide the preferred structural strength at minimal weight.

As best shown in FIG. 6, the inverted, saddle U-shaped saddle structure 30 includes downwardly extending side members 30a and 30b and an open curved concave surface 30c that corresponds to the curvature of the front horizontal stretcher tube 20. The side members 30a and 30b are spaced-apart at least as far as the outside diameter of the front horizontal stretcher tube 20 with additional clearances 35a and 35b, for reasons that will hereinafter be described in detail. Accordingly, the inverted, U-shaped saddle structure 30 on the front end portion 31 of the spreader 25 can be positioned over a segment of the front horizontal stretcher tube 20.

As best shown in FIG. 6, in the preferred embodiment of the invention the apertures 24a, 24b in the front horizontal stretcher tube 20 are formed such that the passages through the stretcher tube 20 formed by the apertures 24 intersect with the axis of the stretcher tube 20. As previously mentioned, the front horizontal stretcher tube 20 is preferably formed of a hollow tubular material having an inner surface 60 and an outer surface 62, most preferably formed of aircraft aluminum, to reduce the weight of the base frame 10. Thus, each of the apertures 24 is preferably formed of a first aperture 24a in the surfaces of the stretcher tube 20 and a second aperture 24b formed in the diametrically opposed surfaces of the stretcher tube 20.

Similarly, while referring briefly to FIG. 8, apertures 26 are formed in the rear horizontal stretcher tube 22. Each of the apertures 26 is preferably formed of a first aperture 26a in the surface of the stretcher tube 22 and a second aperture 26b formed in the diametrically opposed surface of the stretcher tube 22.

Referring back to FIG. 6, the downwardly extending side member 30a has at least one aperture 38a formed therein and the downwardly extending side member 30b also has at least one aperture 38b formed therein. The apertures 38a and 38b preferably form passages completely through the downwardly extending side members 30a and 30b, respectively. The apertures 38a and 38b are of a size adapted to accommodate the threaded end 42a and shaft 42b of a bolt 42, however, the apertures are smaller than the head 42c of the bolt.

Continuing to refer to FIG. 6, a stretcher stirrup 45 is provided that has a generally U-shaped saddle structure. The first stretcher stirrup 45 includes upwardly extending side members 44a and 44b and an open curved surface 44c that corresponds to the curvature of the front horizontal stretcher tube 20. The side members 44a and 44b are spaced-apart at least as far as the outer diameter of the front horizontal stretcher tube 20. Accordingly, the U-shaped stretcher stirrup 45 can be positioned under a segment of the front horizontal stretcher tube 20. The thickness of the upwardly extending side members 44a and 44b is designed such that the side members 44a and 44b can fit in the previously mentioned clearances 35a and 35b, respectively, between the downwardly extending side members 30a and 30b and the front horizontal stretcher tube 20.

As best shown in FIG. 6, the upwardly extending side member 44a has a plurality of apertures 46a formed therein. The apertures 46a preferably form a passage completely through the upwardly extending side member 44a. Similarly, the upwardly extending side member 44b also has a plurality of apertures 46b formed therein that extend completely through the upwardly extending side member 44b. The apertures 46a and 46b are of a size adapted to accommodate the threaded end 42a and shaft 42b of bolt 42, however, the apertures are smaller than the head 42c of the bolt.

Referring again to FIGS. 5 and 6, the inverted, generally U-shaped saddle structure 30 on the front end portion 31 of the spreader 25 and the generally U-shaped stretcher stirrup 45 can be brought together such that they clamp the front horizontal stretcher tube 20 between them. When clamped together over a segment of the front horizontal stretcher tube 20, a pair of apertures 24a and 24b in the stretcher tube 20 are designed to align with both the apertures 38a and 38b in the downwardly extending side members 30a and 30b, respectively, of the generally U-shaped saddle structure 30, and also align with both the apertures 46a and 46b in the upwardly extending side members 44a and 44b, respectively, of the stretcher stirrup 45. The threaded end 42*a* and shaft 42*b* of the bolt 42 can then be positioned through the aligned apertures and screwed into nut 48 to releasably secure the front end portion of the spreader 25 to a linear segment of the front horizontal stretcher tube 20.

Referring now to FIG. 8, the saddle 50 on rear end portion 33 of the spreader 25 is similarly clamped to the rear horizontal stretcher tube 22.

Thus, the entire spreader 25 can be easily and quickly attached to or removed from the rest of the aircraft seat base frame 10 without disassembling any other portion of the base frame.

It is to be understood that even through numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

Having described the invention, what is claimed is:

1. A base frame assembly for a seat comprising:
   a) a pair of spaced stretcher tubes having top, bottom and side quadrants and having longitudinally spaced apertures in said side quadrants;
   b) stirrup members having wall sections for encircling at least a portion of said bottom quadrant of said tubes;
   c) spreaders having spaced saddles, each of said saddles having a generally channel-shaped portion forming a web segment having a concave surface and spaced flange segment configured to encircle at least a portion of said top quadrant and to be mounted on and supported by segments of said spaced stretcher tubes, said flange segments of said saddles having receptacles configured to receive said wall sections of said stirrup members; and
   d) connectors for securing said stirrup members and said saddles to capture segments of said stretcher tubes such that said stretcher tubes are reinforced and stiffened by said stirrup members to resist bending moments.

2. A base frame assembly according to claim 1, said stirrup members comprising: members having a cradle section.

3. A base frame assembly according to claim 2, wherein said stirrup members have a length for engaging a segment of at least one of said stretcher tubes, said length being greater than the width of one of said spreaders.

4. A base frame assembly according to claim 1, wherein said stirrup members have a length that is at least three times the diameter of the stretcher tubes.

5. A base frame assembly according to claim 1, said stirrup members comprising: members having a cradle section formed by said spaced wall sections and a leg secured to said cradle section.

6. A base frame assembly according to claim 1, said stirrup members comprising: stretcher stirrup members having a cradle section formed by said wall sections; and leg stirrup members having a cradle section, second wall sections and a leg secured to said cradle section of said leg stirrup.

7. A base frame assembly for passenger seats comprising:
   a) a plurality of spaced stretcher tubes having top, bottom and side quadrants and having longitudinally spaced apertures in said side quadrants;
   b) stretcher stirrup members having a cradle section, configured to encircle at least a portion of said bottom quadrant, and spaced wall sections;
   c) leg stirrup members having a cradle section, spaced wall sections and a leg secured to said cradle section of said leg stirrup;
   d) connectors for securing said stirrup members and said saddles to capture segments of said stretcher tubes such that said stretcher tubes are reinforced and stiffened by said stirrup members to resist bending moments;
   e) spreaders having spaced saddles configured to encircle at least a portion of said top quadrant and to be mounted on and supported by segments of said spaced stretcher tubes, each of said saddles having a generally channel-shaped portion having a concave surface and spaced flange segments, said flange segments having receptacles to receive said spaced wall sections of said stretcher stirrup members and said spaced wall sections of said leg stirrup members; and
   d) connectors for securing said stirrup members and said saddles to capture segments of said stretcher tubes such that said stretcher tubes are reinforced and stiffened by said stirrup members to resist bending moments.

8. An improved base frame for a passenger seat, said base frame having a front leg structure for supporting a front horizontal stretcher tube and a rear leg structure for supporting a rear horizontal stretcher tube, wherein said improvements comprise:
   (a) a base frame spreader for maintaining the front and rear horizontal stretcher tubes in parallel, spaced-apart relationship, said spreader having a front portion for connecting to said front horizontal stretcher tube and a rear portion for connecting to said rear horizontal stretcher tube, the front portion of the spreader having an inverted, generally U-shaped saddle structure formed thereon that is positioned over the front horizontal stretcher tube, and the rear portion of the spreader having an inverted, generally U-shaped saddle structure formed thereon that is positioned over the rear horizontal stretcher tube;
   (b) a first stirrup having a generally U-shaped structure that is positioned under the front horizontal stretcher tube in cooperative contact with and fastened to the inverted, generally U-shaped saddle structure formed on the front portion of the spreader to releasably clamp the front horizontal stretcher tube therebetween; and
   (b) a second stirrup having a generally U-shaped structure that is positioned under the rear horizontal stretcher tube and fastened to the inverted, generally U-shaped saddle structure on the rear portion of the spreader to releasably clamp the rear horizontal stretcher tube therebetween.

9. The base frame for a passenger seat of claim 8, wherein the front and rear horizontal stretcher tubes, have a plurality of aligned apertures therethrough that are spaced-apart along the length of each stretcher tube, each of the inverted, generally U-shaped saddle structures of the front and rear portions of the spreader having downwardly extending wall sections and having at least one aperture in each of said downwardly extending wall sections thereof, and each of said stirrup members having upwardly extending sections and a plurality of apertures in each of the upwardly extending sections thereof whereby the apertures in the U-shaped saddle structures are aligned with selected corresponding apertures in the stretcher tubes and the stirrups such that the spreader, the stirrups, and the front and rear horizontal stretcher tubes can be releasable connected.

10. An apparatus for supporting a passenger seat having at least one individual seat for a passenger with a seat bottom portion and a seat back portion, the apparatus comprising: at least one front leg supporting a front horizontal stretcher tube; at least one rear leg supporting a rear horizontal stretcher tube that is spaced apart from the front horizontal stretcher tube, said front and rear horizontal stretcher tubes each having a plurality of aligned apertures therethrough that are spaced-apart along the stretcher tubes; at least two spreaders for maintaining the front and rear horizontal stretcher tubes in spaced-apart, parallel relationship, each of the spreaders having a first portion extending generally horizontally between the front horizontal stretcher tube and the rear horizontal stretcher tube for supporting the seat bottom portion of said at least one individual seat and having a second portion extending generally vertically for at least partially supporting the seat back portion of said at least one individual seat, wherein the first portion of the spreader has a front end with an open curved surface formed thereon and spaced-apart downwardly extending wall sections that generally conform to a segment of the upper surface of the front horizontal stretcher tube and the first portion of the spreader has a rear end with an open curved surface formed thereon and spaced-apart downwardly extending wall sections that generally conform to a segment of the upper surface of the rear horizontal stretcher tube, each of the downwardly extending wall sections having an aperture formed therein, whereby the spreader can be removably positioned over the front and rear horizontal stretcher tubes and such that the apertures in the downwardly extending wall sections align with selected apertures in the front and rear horizontal stretcher tubes; generally U-shaped stirrups having an open curved surface and generally upwardly extending wall sections for engaging a segment of the lower surfaces of the front and rear horizontal stretcher tubes, each of the upwardly extending wall sections having an aperture formed therein, whereby the stirrups can be removably positioned over the front and rear horizontal stretcher tubes, such that the apertures in the upwardly extending wall sections align with selected apertures in the front and rear horizontal stretcher tubes and with the aperture of said downwardly extending wall sections of said spreaders; connector means for connecting the downwardly extending wall sections of the spreaders to the upwardly extending wall sections of the stirrups through selected apertures in the front and rear horizontal stretcher tubes whereby the front and rear horizontal stretcher tubes are releasably clamped between the spreaders and the stirrups and such that the spreaders can be positioned as desired along the front and rear horizontal stretcher tubes.

11. An apparatus according to claim 10, wherein said stirrups are integrally formed on the upper ends of said front and rear legs, whereby the connection of said connector means through said integrally formed stirrups connects said horizontal stretcher tubes to said legs and at least one of said spreaders.

12. An apparatus according to claim 10, wherein said stirrups are symmetrically formed such that said stirrups can be used to connect one of said spreaders to either one of said front horizontal stretcher tube and said rear horizontal stretcher tube.

13. An apparatus according to claim 10, wherein said connector means is a screw having a threaded end and one of said apertures of said downwardly extending walls of said spreader is threaded for receiving the threaded end of said screw.

14. An apparatus according to claim 10, further comprising: at least one reinforcing strut connected between said front leg and said rear leg.

15. An apparatus according to claim 10, wherein each of said spreaders is integrally formed having a web that is oriented in a plane transverse to the parallel front and rear stretcher tubes and stiffening flanges and ribs that project perpendicularly to either side of said web.

16. An apparatus according to claim 10, wherein said stirrups have a length for engaging a segment of the stretcher tube, said length being wider than the spreader.

17. An apparatus according to claim 10, wherein said stirrups have a length that is at least three times the diameter of the stretcher tubes.

* * * * *

UNITED STATES PATENT AND TRADEMARK OFFICE
CERTIFICATE OF CORRECTION

PATENT NO. : 5,553,923

DATED : September 10, 1996

INVENTOR(S) : Vahe Bilezikjian

It is certified that error appears in the above-indentified patent and that said Letters Patent is hereby corrected as shown below:

Column 4, line 45 delete "," and insert --;--.

Column 6, line 27 change "15" to read --25--.

Column 7, line 28 delete the comma at the beginning of the line.

Signed and Sealed this

Third Day of June, 1997

Attest:

BRUCE LEHMAN

*Attesting Officer*   *Commissioner of Patents and Trademarks*